June 21, 1949.　　　A. KADISH　　　2,474,108
MIXING SPOUT FIXTURE FOR WASH BASINS
Filed Sept. 19, 1946
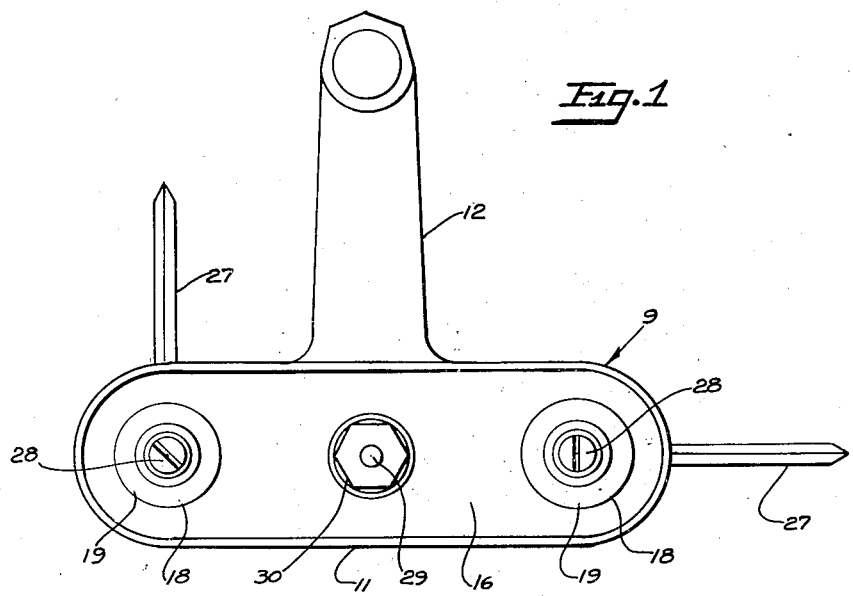
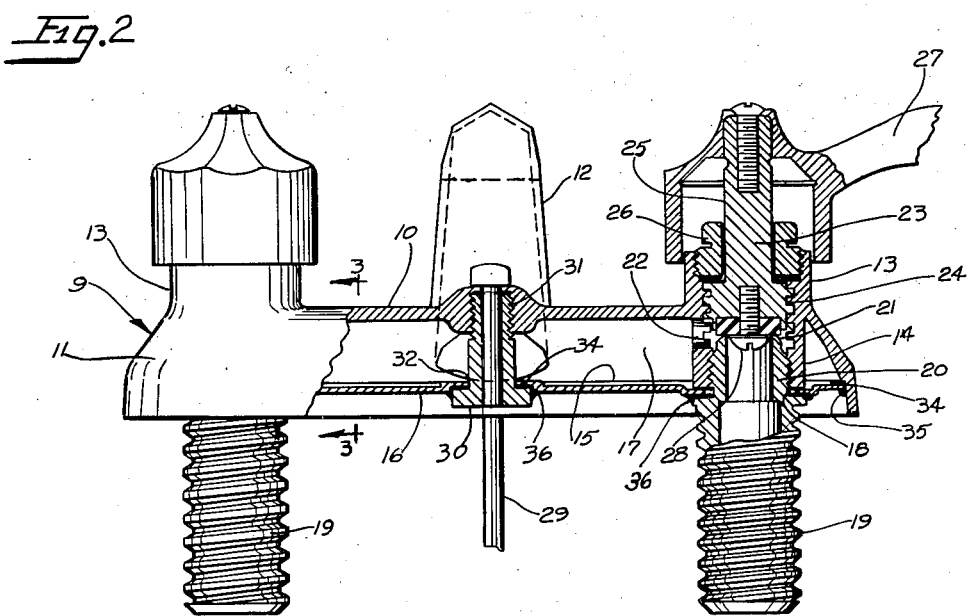
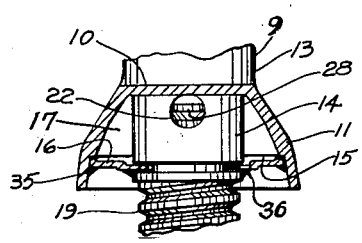
INVENTOR.
ABRAHAM KADISH
BY
Clark & Ott
ATTORNEYS Patented June 21, 1949

2,474,108

UNITED STATES PATENT OFFICE 2,474,108

MIXING SPOUT FIXTURE FOR WASHBASINS

Abraham Kadish, Long Island City, N. Y.

Application September 19, 1946, Serial No. 697,893

5 Claims. (Cl. 137—111)

1

This invention relates to plumbing fixtures and more particularly to an improved mixing spout fixture for wash basins and to a method of producing the same.

It has been the practice to produce mixing spout fixtures by sand molding in which a sand core is utilized to form the mixing chamber and the passageway leading from the mixing chamber through the spout. Castings produced by the aforesaid molding operation have rough, inner and outer surfaces necessitating hand grinding thereof on an emery wheel for removing the rough outer surface which is followed by a polishing operation before applying the finished plating of nickel. In addition thereto sand holes frequently occur in the casting which must be filled in by brazing metal thereto. In many instances the sand holes are not revealed until after the grinding operation has been completed and are of a character which prohibit the use of the casting resulting in increased cost of production. In such instances the casting must be rejected after considerable time and labor have been expended in the production thereof.

The present invention has in view a fixture for said purpose which overcomes the objections and disadvantages of the fixture produced by sand molding and which substantially eliminates the loss due to imperfect castings produced thereby.

The invention has for a further object the provision of a fixture of said character which is produced so as to provide a relatively smooth exterior surface to thereby reduce surface grinding thereof to a minimum and which also has a relatively smooth inner surface defining the mixing chamber and by which the character of the surfaces thereof may be determined before the machining and polishing of the casting.

The invention has for a further object a fixture consisting of a hollow body having an open side which is closed by a flat plate so as to form a mixing chamber therewith.

The invention also comprehends a method of producing a fixture of said character consisting in casting the casing portion thereof in a hydraulic pressure casting machine and interfitting in said casing a flat plate so as to form a mixing chamber therewith.

With the foregoing and other objects in view, reference is now made to the following specification and accompanying drawings in which a fixture embodying the invention and constructed in accordance with the method is illustrated.

In the drawings:

2

Fig. 1 is a bottom plan view of the fixture embodying the invention and constructed in accordance with the method.

Fig. 2 is an enlarged view in elevation thereof with a portion shown in vertical section.

Fig. 3 is a vertical sectional view taken approximately on line 3—3 of Fig. 2.

Referring to the drawings by characters of reference, the fixture includes a body 9 of elongated hollow formation comprising a top wall 10, a depending side wall 11 extending completely about the periphery of the top wall and a discharge spout 12 projecting laterally from the side wall 11 medially of one of the longitudinal sides thereof. Formed integrally with the top wall are upwardly and downwardly projecting tubular bosses 13 and 14 located adjacent the opposite ends of the body with the downwardly projecting bosses 14 terminating within the confines of the peripheral wall 12 and with the openings through the bosses disposed in vertical alignment.

The side wall 11 has its inner face recesses continuously about the periphery thereof adjacent its lower edge so as to provide a shoulder 15 adapted to receive a bottom plate 16 within the confines of said side wall 11 to close the lower open side of the body 9 with the peripheral edge portion of the plate seated against the shoulder 15 and forming a mixing chamber 17 within the body 9. The plate 16 is apertured as at 18 adjacent its opposite ends and in alignment with the openings through the bosses 13 and 14. Surrounding the apertures 18 the bottom plate 16 is tightened against the lower ends of the downwardly projecting bosses 14 by means of nipples 19 having reduced exteriorly threaded upper ends 20 threadedly engaged in the lower ends of the downwardly projecting bosses 14.

The upper ends of the nipples 19 form valve seats 21 through which the water enters the fixture and passes into the mixing chamber 17 through outlets 22 in the side walls of the downwardly projecting bosses 14. The passage of the water through the valves 21 is adapted to be regulated by spindles 23 threadedly engaged in the interiorly square threaded portions 24 of the bosses 13 and 14 and which are formed with upwardly extending reduced shanks 25 protruding through nuts 26 threadedly engaged in the upper end of the bosses 13 and to which handles 27 are secured for turning the spindles on the square threaded portions 24. The lower ends of the spindles 23 are provided with the usual compressible washers 28 adapted to engage against the valve seats 21 for closing the same.

In order to provide means for opening and closing the drain in the wash basin a manipulating rod 29 is provided which projects upwardly through an apertured stud 30 secured in a threaded opening 31 in the top wall 10 of the body with the headed lower end of the stud tightened against the bottom plate 16 surrounding the opening 32 therein.

As illustrated, gaskets 34 are provided between the lower end of the downwardly projecting bosses 14 and the bottom plate 16 and between the shoulder 15 and the inner peripheral edge of the bottom plate 16 and between the headed outer end of the stud 30 and the bottom plate 16. By this construction the bottom plate is impinged tightly against the gaskets by the tightening of the nipples 19 and the stud 30 so as to prevent leakage of the water from the mixing chamber. If desired, instead of the said gaskets, the bottom plate 16 may be continuously welded to the body 9 about the periphery of the bottom plate as indicated by the welding material 35, and the nipples 19 and stud 30 may similarly be welded to the bottom plate by welding material 36 so as to retain the bottom plate in position and prevent leakage of the water from the mixing chamber. It will be understood that the nipples 19 are respectively adapted to be connected to hot and cold water supply pipes so as to provide either hot or cold water or to mix the hot and cold water in the mixing chamber 17 by manipulation of the handles 27 to thereby provide hot and cold water as desired.

In manufacturing the fixture the body 9 or casing portion is produced in a hydraulic pressure casting machine between mating steel dies. By this method the molten metal is forced by hydraulic pressure between the mating dies to thereby produce the said casing with the spout 12 formed integral therewith and with the side wall 11 formed with the shoulder 15. The bottom wall 16 is produced from a metal sheet preferably by a stamping operation to cut and form the same to interfit within the peripheral side wall 12 of the body or casing and with the openings 18 arranged in alignment with the openings in the bosses 13 and 14. Produced in this manner the interior surface of the fitting forming the mixing chamber is relatively smooth while the outer surface of the casing is also relatively smooth so as to practically eliminate the necessity of smoothing the outer surface by hand grinding thereof on an emery wheel as required in connection with castings produced by sand molding. Furthermore the castings produced in the hydraulic pressure casting machine are free from blow holes and the like whereby more perfect castings are produced resulting in a saving in cost and increased production.

After the parts of the fixture are produced as aforesaid, the same may be secured together by welding the plate to the casting and to the downwardly projecting bosses 14 as hereinbefore described.

What is claimed is:

1. In a plumbing fixture, an elongated hollow casing comprising a top wall and a depending peripheral side wall extending completely about the periphery of the top wall, an upwardly projecting tubular boss and a downwardly projecting tubular boss formed integrally with the top wall and located adjacent each end thereof with the downwardly projecting bosses terminating within the confines of the peripheral side wall and with the openings through the bosses disposed in alignment, a discharge spout formed integrally with the side wall and projecting laterally therefrom, said side wall having its inner face continuously recessed about the periphery thereof adjacent its lower edge to define a peripheral shoulder, a bottom plate fitted within the confines of the peripheral side wall with the edge portion of the plate seated against the said shoulder and closing the lower face of the casing to thereby form a mixing chamber within the casing, said plate having apertures disposed in alignment with the openings through said bosses and nipples threadedly engaging in the lower ends of said downwardly projecting bosses and securing the plate against the lower ends thereof to thereby fasten the plate within the confines of the peripheral side wall, said downwardly projecting bosses having openings leading into said mixing chamber and said nipples providing valve seats at their upper ends for admitting hot and cold water to said mixing chamber through the openings in said bosses.

2. In a plumbing fixture, an elongated hollow casing comprising a top wall and a depending peripheral side wall extending completely about the periphery of the top wall, an upwardly projecting tubular boss and a downwardly projecting tubular boss secured to the top wall and located adjacent each end thereof with the downwardly projecting bosses terminating within the confines of the peripheral side wall and with the openings through the bosses disposed in alignment, a discharge spout formed integrally with the side wall and projecting laterally therefrom, said side wall having its inner face continuously recessed about the periphery thereof adjacent its lower edge to define a peripheral shoulder, a bottom plate fitted within the confines of the peripheral side wall with the edge portion of the plate seated against the said shoulder and closing the lower face of the casing to thereby form a mixing chamber within the casing, said plate having apertures disposed in alignment with the openings through said bosses, nipples threadedly engaging in the lower ends of said downwardly projecting bosses and securing the plate against the lower ends thereof to thereby fasten the plate within the confines of the peripheral side wall, said downwardly projecting bosses having openings leading into said mixing chamber and said nipples providing valve seats at their upper ends for admitting hot and cold water to said mixing chamber through the openings in said bosses.

3. In a plumbing fixture, an elongated hollow casing having an open side, an upwardly projecting tubular boss and a downwardly projecting tubular boss formed integrally with said casing and located adjacent each end thereof with the downwardly projecting bosses terminating within the confines of the casing and with the opening through the bosses disposed in alignment, said casing having its inner face continuously recessed to form a shoulder extending about the periphery thereof adjacent the open side, a plate fitted within said casing with the edge portion thereof seated against said shoulder and closing the open side of the casing to form a mixing chamber within the casing, and nipples threadedly engaging the lower ends of said downwardly projecting bosses and securing the plate against the lower ends thereof, said downwardly projecting bosses having openings leading into said mixing chamber and said nipples providing valve seats at the upper ends for admitting hot and cold water to said mixing chamber through the openings in said bosses.

4. In a plumbing fixture, an elongated hollow casing having an open side, a tubular boss located within and adjacent each end of said casing and formed integrally therewith, a plate secured to said casing closing the open side thereof to form a mixing chamber within the casing, said plate engaging said bosses and having openings in alignment with the openings through said bosses, said bosses having apertures leading into said mixing chamber, and nipples extending through said openings in said plate and secured in the outer ends of said bosses and having valve seats at the inner ends thereof for admitting hot and cold water to said mixing chamber through the apertures in said bosses.

5. In a plumbing fixture, an elongated hollow casing comprising a main wall and a depending peripheral side wall extending completely about the periphery of the main wall and formed integrally therewith, a tubular boss secured to said main wall adjacent each end of and extending into said casing with the openings in said bosses extending through the main wall of the casing, a plate secured to said casing closing the open side thereof to form a mixing chamber within the casing, said plate engaging said bosses and having openings in alignment with the openings through said bosses, said bosses having apertures leading into said mixing chamber, and nipples extending through said openings in said plate and secured in the outer ends of said bosses and having valve seats at the inner ends thereof for admitting hot and cold water to said mixing chamber through the apertures in said bosses.

ABRAHAM KADISH.

REFERENCES CITED

The following references are of record in the file of this patent:

UNITED STATES PATENTS

| Number | Name | Date |
| --- | --- | --- |
| Re. 21,925 | Smith | Oct. 14, 1941 |
| 587,632 | Abt | Aug. 3, 1897 |
| 1,647,984 | Bloch | Nov. 8, 1927 |